June 29, 1954  D. P. SMITH  2,682,475
CHEESE PACKAGING
Filed Aug. 7, 1950

INVENTOR.
Donald P. Smith
BY
Lieber & Lieber
ATTORNEYS.

Patented June 29, 1954

2,682,475

UNITED STATES PATENT OFFICE 2,682,475

CHEESE PACKAGING

Donald P. Smith, Milwaukee, Wis., assignor to Milprint, Inc., Milwaukee, Wis., a corporation of Delaware Application August 7, 1950, Serial No. 178,049

2 Claims. (Cl. 99—178)

The present invention relates primarily to improvements in the art of packing commodities in batches for merchandizing purposes, and relates more specifically to an improved method of packaging cheese batches and to an improved package resulting from exploitation of the method.

The primary object of my invention is to provide an improved method of protectively enwrapping batches of cheese, and an improved package resulting from the use of the new method.

In the cheese industry, it is especially desirable when wrapping batches of rindless cheese, to provide packages within which the cheese is normally hermetically sealed, and from which the wrapping material may be conveniently removed so as to leave each cheese batch free from foreign matter adhering to the external surfaces thereof. This procedure not only maintains the cheese in wholesome and sanitary condition, but also eliminates waste which results from cutting away rind and other obnoxious substance on the batches.

It is therefore a more specific object of the present invention to provide a simple but highly effective method of packing cheese batches, whereby the batches are normally hermetically sealed and thoroughly protected, while being readily accessible for use in clean and unadulterated condition.

Another specific object of this invention is to provide an attractive and thoroughly sealed cheese package wherein the wrapping material may be easily removed so as to present the cheese batches in wholesome condition.

Still another specific object of the present invention is to provide an improved cheese package wherein the wrapper may be readily opened and effectively resealed by mere application of slight pressure to protect the remaining contents.

A further object of my present invention is to provide various improvements in the art of cheese packaging, whereby successive blocks or batches of various kinds of this commodity, may be quickly and efficiently enwrapped so as to protectively conceal the cheese while still permitting convenient access thereto.

These and other objects and advantages of the invention will be apparent from the following description.

A clear conception of the several steps involved in my improved cheese packing method, and of the construction of a typical cheese package resulting from the use thereof, may be had by referring to the drawing accompanying and forming a part of this specification wherein like reference characters designate the same or similar parts in the various views.

Figure 1:
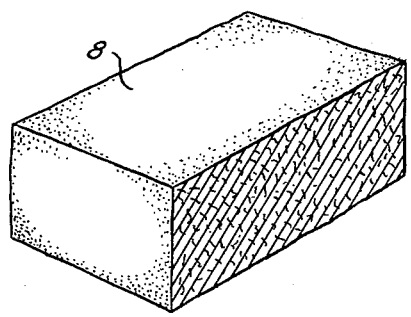
Fig. 1 is a perspective view of a rindless block of cheese free from coating and wrappings, a longitudinal vertical section having been taken therethrough near one side.

The gist of my present invention is the provision of a method of packing a batch or block of cheese, preferably rindless cheese, by coating the batch with a relatively uninterrupted layer of flexible and relatively tenacious wax-like material, and by thereafter snugly applying to the coating a flexible outer wrapper sheet adapted to adhere to the coating and to peel the latter off of the cheese batch when the wrapper is withdrawn. While the invention has been described herein as being especially and advantageously applicable to blocks of rindless cheese and as involving a wrapper lined with wax, it is not my desire or intention to unnecessarily restrict the utility of the improvement by virtue of this limited embodiment shown in the drawing; and it is also contemplated that specific descriptive terms be given the broadest possible interpretation consistent with the disclosure.

Figure 2:
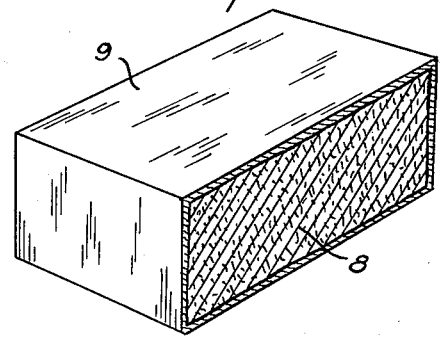
Fig. 2 is a similar sectional perspective view of the same cheese block coated with a layer of wax.
Figure 3:
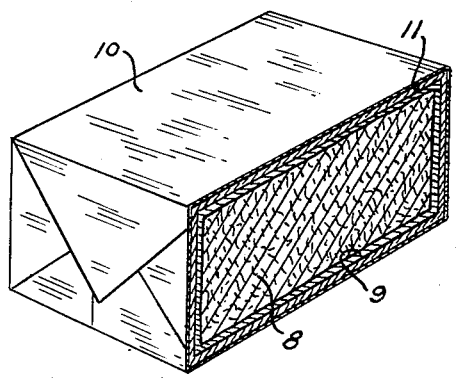
Fig. 3 is another similar sectional perspective view of the coated cheese block but having a wrapper lined with a suitable pressure sensitive adhesive applied thereto to complete the package.

Referring to the drawing, the steps involved in the improved cheese packing method are visibly shown in Figs. 1 to 3 inclusive, Fig. 1 illustrating a rectangular block or batch 8 of cheese, while Fig. 2 depicts the same batch 8 completely covered by a flexible coating or layer 9 of tenacious wax; and Fig. 3 shows the wax-coated batch 8 concealed within a flexible wrapper sheet 10 provided with a lining 11 of suitable material adapted to adhere to the exterior of the coating 9.

The batch 8 may be cut from a larger cake of natural or processed cheese and is therefore at least partially rindless, and the initial uninterrupted coating layer 9 may be uniformly applied either by spraying, brushing, or by dipping the batch into a vat containing molten wax which when solidified presents a flexible and relatively tenacious hermetically sealed coating which will not crack or chip at any temperature or due to rough handling. For this purpose a microcrystalline petroleum wax or other natural or synthetic waxes containing resin, natural rubber, or petroleum, and which will not detrimentally affect the cheese, may be utilized, and the coated batches may be blocked to provide smooth external surfaces as depicted in Fig. 2. As more specific examples of the cheese coatings which may be used, this coating may consist of a full microcrystalline wax blend such as 75% 145° F. melting point wax and 25% 130° F. M. P. wax. A tougher coating which will draw out of deep mechanical openings in the cheese and which tends to apply a thicker coating may consist of up to 5% higher molecular weight "Vistanex," up to 15% low molecular weight "Vistanex," up to 25% butyl rubber or S-polymer resin, or up to 10% natural rubber. Resins such as polypinenes, ester gums, etc., may be added to give fluidity and improved adhesion to the cheese and to the wrapper. These resins, generally, reduce oil resistance of the wax, however. Resins such as "Armids" or highly hydrogenatral oils such as "Opal Wax" improve oil resistance but lower tackiness of this coating or dip wax.

The wrapping sheet 10 may be formed of ordinary tough paper, film, foil, or cloth, and the adhesive lining 11 may be of any desirable thickness and may consist of a type of adhesive lacquer, shellac, wax or wax modified with ester gum, polyisobutylene, rubber, synthetic resin, or similar tacky substance adapted to cling to the external surface of the batch coating 9 and to fill and level crevices therein. I have found that a wax-like coating 11 composed of the following ingredients applied to "Cellophane," foil, "Pliofilm," tough paper, or the like is very satisfactory for this purpose:

| | Per cent |
|---|---|
| Microcrystalline wax (145° F. M. P.) | 86 |
| Polyisobutylene high molecular weight | 4 |
| Polyisobutylene low molecular weight | 10 |

Other polymers may be substituted for either or both polyisobutylenes. This coating can be applied in weights of from 15 to 50 pounds per ream of film to give a soft tough texture and to bond well to the dip coating.

In order to insure snug engagement between the wrapper lining 11 and the cheese coating 9, it may also be desirable to utilize heat, pressure, or time shrinking films or other wrappers 10 in conjunction with the coated batches 8. These wrappers 10 may therefore be formed of tensilized "Pliofilm," "Cellophane," "Saran," "Cry-o-vac," or other flexible sheet material which will shrink with time or variations in temperature and will thus cause the lining 11 to intimately contact the coating 9. They may also be initially composed of moist applied paper or cloth adapted to shrink as it dries, and such shrinking or pressure application of the wrapper 10 in any manner is desirable in order to obtain effective bonding thereof with the coating 9 and to eliminate bubbles or holes in the soft wax coating 9.

Figure 4:
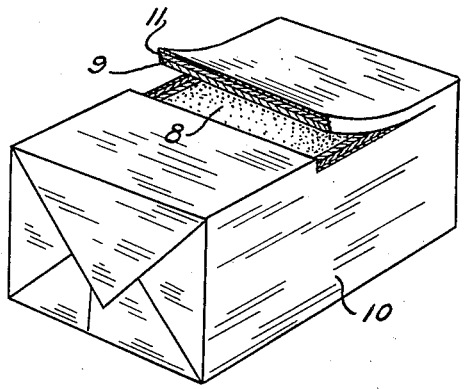
Fig. 4 is still another perspective view of the completed package with a portion of the wrapper and adhering wax coating stripped therefrom to expose a part of the cheese.
Figure 5:
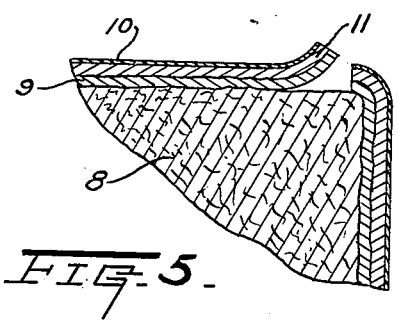
Fig. 5 is an enlarged section through an edge portion of the cheese, depicting the manner in which the lined wrapper removes the wax coating from the original cheese block when the package is being opened.

When a cheese package has been properly produced in accordance with my present invention, the batch 8 will be hermeticaly sealed in a sterilized coating and will effectively resist relatively rough handling, but may be quickly and conveniently opened as illustrated in Figs. 4 and 5 by merely cutting through the wrapper 10, lining 11 and coating 9 and by thereafter withdrawing the composite covering. The wrapping sheet will then adhere to the flexible coating 9 and will peel the latter off of the cheese batch 8 so as to leave the rindless external surface of the cheese clean and free from foreign matter. This removal of the wrapper and coating may be effected from any desired portion of the batch 8, and after a part of the cheese has been removed the remainder may be covered and resealed by utilizing the internally sticky peeled off flap of the outer wrapper in an obvious manner and applying pressure thereto.

From the foregoing detailed description it will be apparent that I have in fact provided a method of effectively enwrapping blocks of cheese whereby the commodity is thoroughly concealed and protected. The use of the flexible outer wrapper 10 with its adhesive lining 11 snugly embracing the coating 9, effectively closes pores or pinholes which might exist in the wax coating and also provides means for readily removing the coating layer so as to present the batch 8 in clean and moist condition. The present improved method also permits the use of softer wax in the coating 9 which may be more conveniently blocked to produce a neat and attractive package, and the outer wrapper sheet 10 may be either opaque or transparent and attractively printed or decorated to improve the aesthetic appearance. This outer wrapper 10 also serves to protect the inner coating 9 against possible damage due to rough handling, and may be easily applied to the coated cheese batches by various wrapping methods to compress and seal the softer coating 9.

It should be understood that it is not desired to limit the present invention to the exact steps of the wrapping method or to the precise details of construction of the wrappings, herein shown and described, for various modifications within the scope of the appended claims may occur to persons skilled in the art.

I claim:

1. The method of packing a pre-formed rindless batch of cheese, which comprises, directly coating the cheese batch with a continuous uninterrupted layer of molten wax possessing flexible and tenacious qualities, and thereafter snugly applying to the wax coated cheese batch a flexible outer wrapper sheet lined with an adhesive substance consisting of a material possessing the properties of sealing and adhering to the wrapper sheet and to the wax coating, whereby the latter is peeled from the cheese batch as the wrapper sheet is withdrawn.

2. An article of manufacture comprising, a preformed batch of rindless cheese covered over its entire area with an uninterrupted intimate coating of flexible and tenacious wax, the wax coated cheese batch being snugly confined within a flexible outer wrapper sheet lined with an adhesive sealable substance consisting of a material intimately adhered to the wrapper sheet and adhesively uniteable with the underlying wax coating over its entire area, whereby the latter is adapted to be peeled from the cheese batch upon withdrawal of the wrapper sheet.

References Cited in the file of this patent

UNITED STATES PATENTS

| Number | Name | Date |
|---|---|---|
| 1,925,443 | Gere | Sept. 5, 1933 |
| 2,077,300 | Abrams et al. | Apr. 13, 1937 |
| 2,302,200 | Fassbender | Nov. 17, 1942 |
| 2,348,689 | Abrams et al. | May 9, 1944 |
| 2,394,833 | Young et al. | Feb. 12, 1946 |
| 2,402,605 | Cowen | June 25, 1946 |

OTHER REFERENCES

"Journal of Dairy Science," May 1937, vol. XX, pages 231–38, article entitled "Wrappers for Processed Cheese."